(12) United States Patent
Lin et al.

(10) Patent No.: US 8,956,561 B2
(45) Date of Patent: Feb. 17, 2015

(54) METHOD FOR MAKING GLOVES WITH ENHANCED GRIPPING POWER

(75) Inventors: Charles Lin, Jiangsu (CN); Jack Fang, Jiangsu (CN); Jim Kong, Jiangsu (CN)

(73) Assignee: Charles Lin, Nantong, Jiangsu (CN)

( * ) Notice: Subject to any disclaimer, the term of this patent is extended or adjusted under 35 U.S.C. 154(b) by 36 days.

(21) Appl. No.: 13/505,578

(22) PCT Filed: Jul. 9, 2010

(86) PCT No.: PCT/CN2010/075084
§ 371 (c)(1),
(2), (4) Date: May 2, 2012

(87) PCT Pub. No.: WO2012/003641
PCT Pub. Date: Jan. 12, 2012

(65) Prior Publication Data
US 2012/0216377 A1 Aug. 30, 2012

(51) Int. Cl.
*B28B 1/38* (2006.01)
*B29C 41/14* (2006.01)
*B29L 31/48* (2006.01)

(52) U.S. Cl.
CPC ......... *B29C 41/14* (2013.01); *B29L 2031/4864* (2013.01)
USPC ........................................................ 264/305

(58) Field of Classification Search
USPC ........................................................ 264/305
See application file for complete search history.

*Primary Examiner* — Larry Thrower
(74) *Attorney, Agent, or Firm* — Houtteman Law LLC

(57) ABSTRACT

A method for making gloves with enhanced gripping power, comprises: step 1, making a glove liner; step 2, covering a hand former with the glove liner and putting it into an oven for pre-heating; step 3, dipping the hand former into a coagulant completely; step 4, dipping the hand former into a latex; step 5, drying the surface; step 6, dipping the hand former into the latex again; step 7, spraying soluble solid particles on the surface evenly; step 8, baking; step 9, dipping the hand former into water to dissolve the soluble solid particles; step 10, baking; getting a glove with enhanced gripping power. The glove made by the method has good flexibility, can prevent oil permeability and has good slip-proof effect.

7 Claims, 2 Drawing Sheets

METHOD FOR MAKING GLOVES WITH ENHANCED GRIPPING POWER

TECHNICAL FIELD

Figure 1:
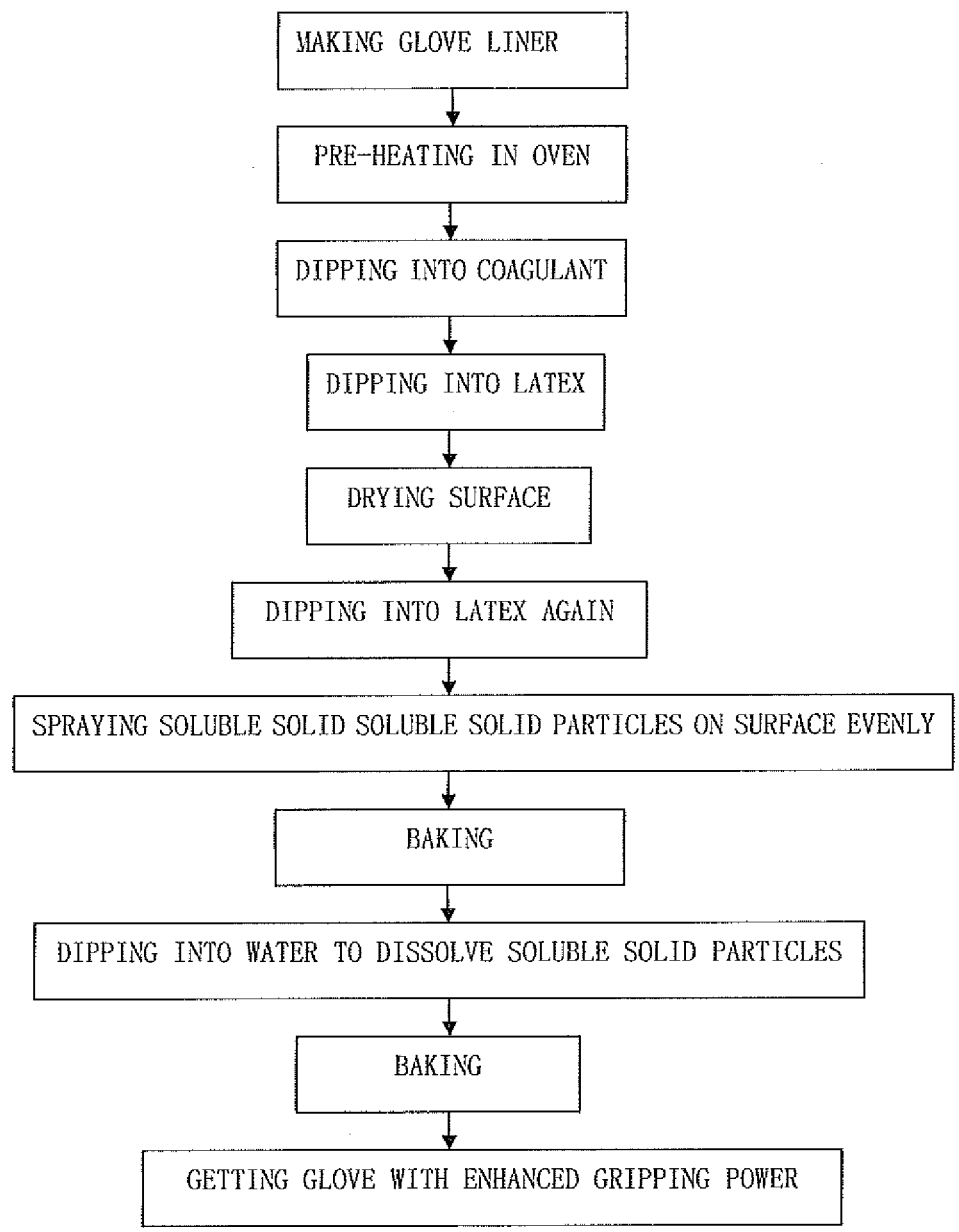

The present invention relates to a fabrication process of rubber gloves, and more particularly, to a method for making gloves with enhanced gripping power.

BACKGROUND OF THE INVENTION

The existing rubber gloves have poor elasticity, and the slip resistance thereof in an oily environment decreases significantly, which brings a potential safety hazard. A solution in the prior art is mainly to perform post treatment on a latex surface to form beads on the latex surface, so as to improve the slip-proof effect, which, however, is labor consuming and costly, and fails to improve the elasticity of the existing rubber gloves.

SUMMARY OF THE INVENTION

In view of the defects in the prior art, the present invention is directed to a method for making gloves with enhanced gripping power.

In order to achieve the above objective, the present invention adopts the following technical solution.

A method for making gloves with enhanced gripping power includes the following steps.

In step 1, a thin nylon yarn and a moderate spandex are bundled together, the bundle is fed in two yarns on a knitting machine, and a glove liner is made by using a 15-gauge glove machine.

In step 2, a hand former is covered with the glove liner and put into an oven of 75° C. to 80° C. for pre-heating for 15 minutes.

In step 3, after the pre-heating, the hand former covered with the glove liner is dipped into a coagulant completely.

The coagulant is a mixed solution of calcium chloride and methanol with a concentration of 1.8%. The mixed solution of calcium chloride and methanol with the concentration of 1.8% refers to that, every 100 kg of the mixed solution contains 1.8 kg of calcium chloride, and the rest is methanol solution.

In step 4, the hand former covered with the glove liner that has been dipped with the coagulant is dipped into a latex, and is dipped into the latex for 10 mm with the palm down.

The latex is a mixture of vulcanized nitrile-butadiene rubber and water-soluble polyurethane latex.

In step 5, the surface of the hand former covered with the glove liner that has been dipped with the latex is dried, that is, the hand former covered with the glove liner that has been dipped with the latex is put into a hot blast heater, and hot blast of 60° C. to 70° C. is blown to the surface of the glove liner for 120 s under an even turning condition.

In step 6, after the surface is dried, the hand former covered with the glove liner is dipped into the latex mentioned in step 4 again, and is dipped into the latex for 12 mm with the palm down.

In step 7, the hand former covered with the glove liner is taken out from the latex, and soluble solid particles with a particle size of 60 to 80 meshes are sprayed on the surface evenly, in which the soluble solid particles are sugar, salt or sodium sulfate with a particle size of 60 to 80 meshes.

In step 8, the hand former covered with the glove liner, the surface thereof being sprayed with the soluble solid particles, is baked, that is, the hand former covered with the glove liner, the surface thereof being sprayed with the soluble solid particles, is put into the oven, the temperature of which is maintained at 75° C. to 80° C., and is baked for 15 min.

In step 9, the hand former covered with the glove liner, the surface thereof being baked and sprayed with the soluble solid particles, is dipped into water to dissolve the soluble solid particles, that is, the hand former is dipped for three times, each lasting for 15 min. For the first time, water of room temperature is used, for the second time, warm water of 40° C. is used, and for the third time, water of room temperature is used.

In step 10, the hand former covered with the glove liner that has been dipped is baked, that is, the hand former covered with the glove liner, the surface thereof being sprayed with the soluble solid particles, is put into the oven, the temperature of which is maintained at 75° C. to 80° C., and is baked for 45 min, and is further baked for 60 min after the temperature of the oven is adjusted to 90° C. to 95° C.

In step 11, the glove liner is taken off from the hand former, thereby getting a glove with enhanced gripping power.

Based on the above technical solution, the viscosity of the latex in steps 4 and 6 is 650 to 750 mPa·s.

Based on the above technical solution, a specific method for preparing the vulcanized nitrile-butadiene rubber is described as follows.

In step 3.1, a vulcanization dispersing agent is prepared according to the following proportioning:

| |
| --- |
| water 100 kg |
| sulphur 14 kg |
| zinc oxide 28 kg |
| accelerator BZ 7 kg |
| titanium dioxide 28 kg |
| age resistor BHT18.6 kg |
| dispersing agent NF- 3 kg |
| 10% casein 7 kg |
| abrasion resistor AG-212 10.5 kg |

In step 3.2, the components in step 3.1 are mixed and put into a ball grinder for grinding for more than 48 hours, until the mesh thereof is below 600, thereby obtaining the vulcanization dispersing agent.

In step 3.3, 5.4 kg to 5.6 kg of the vulcanization dispersing agent made in step 3.2 is added into every 100 kg of nitrile-butadiene rubber, and the nitrile-butadiene rubber is vulcanized.

Based on the above technical solution, the vulcanization dispersing agent is of 650 to 750 meshes.

Based on the above technical solution, specific steps for vulcanizing the nitrile-butadiene rubber include: taking 180 kg of the nitrile-butadiene rubber and 10 kg of the vulcanization dispersing agent; first stirring the nitrile-butadiene rubber for 2 hours at a constant stirring speed of 40 rad/min; then slowly pouring the vulcanization dispersing agent at a stirring speed of 80 rad/min, and performing heat preservation at above 28° C. for two hours; and settling the mixture for 48 hours for later use.

The slow pouring of the vulcanization dispersing agent refers to that 10 kg of the vulcanization dispersing agent is completely added within 1 min.

Based on the above technical solution, the method for preparing the water-soluble polyurethane latex is: taking 100 g of water-soluble polyurethane and 25 g of sodium polyacrylate, and stirring evenly for 60 min at a rotating speed of 80 rad/min.

Based on the above technical solution, 88 kg of vulcanized nitrile-butadiene rubber is added with 12 kg of water-soluble polyurethane, stirred for 10 min and foamed for 10 min, then added with the sodium polyacrylate and tackified to 400 mPa·s, added with 12 kg of water at a rotating speed of 600 rad/min, foamed for 120 min at a constant rotating speed of 200 rad/min, added with the sodium polyacrylate and tackified to 700±50 mPa·s, added with 4 kg of a rubber softener of AS.TMD-1747 type, and finally stirred for 30 min, to obtain the latex with the viscosity of 650 to 750 mPa·S.

Based on the above technical solution, the thin nylon yarn is a nylon yarn of 40D, and the moderate spandex is a spandex of 30D.

The nylon yarn of 40D and the spandex of 30D are bundled together, the bundle is fed in two yarns on the knitting machine, and the glove liner is made by using the 15-gauge glove machine.

The method for making gloves with enhanced gripping power has the following advantages:

A. The gloves with enhanced gripping power made through the method of the present invention have good elasticity, and each joint of fingers can be used as in a method for making gloves without enhanced gripping power.

B. Sweat produced in the palm during working seeps from the latex surface, and a small amount of grease in the working environment can be absorbed by the surface and enters pores of rubber particles, but the grease will never seep into the hand.

C. The slip-proof effect is desirable, and is more than three times greater than that of similar normal gloves

THE DRAWINGS

Figure 2:
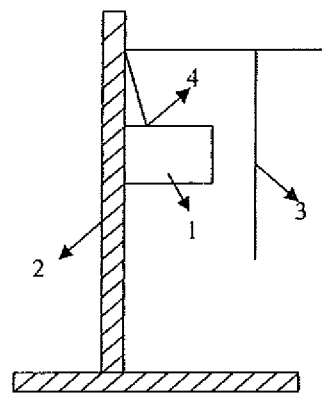
Figure 3:
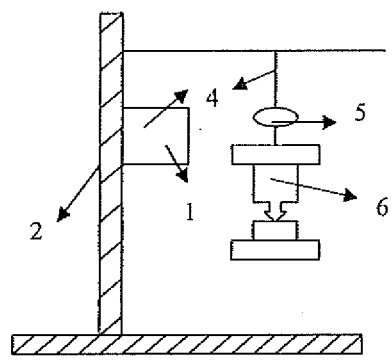

The present invention includes the following accompanying drawings:

FIG. 1 is a process flow chart;
FIG. 2 is a schematic view of an apparatus used in test 1; and
FIG. 3 is a schematic view of an apparatus used in test 2.

DETAILED DESCRIPTION

The present invention is further described in detail hereinafter with reference to the accompanying drawings.

A process of a method for making gloves with enhanced gripping power provided by the present invention is shown in FIG. 1, and includes the following steps.

In step 1, a thin nylon yarn and a moderate spandex are bundled together, the bundle is fed in two yarns on a knitting machine, and a glove liner is made by using a 15-gauge glove machine. The thin nylon yarn is a nylon yarn of 40D, and the moderate spandex is a spandex of 30D. The nylon yarn of 40D and the spandex of 30D are bundled together, the bundle is fed in two yarns on the knitting machine, and the glove liner is made by using the 15-gauge glove machine.

The glove liner is selected based on a method of nylon plus spandex. If the nylon and spandex are directly mixed together on the knitting machine, the nylon yarn is rapidly contracted by the spandex, and therefore the glove liner becomes thick. The present invention requires the glove liner to be thin and soft. Therefore, in the present invention, the thin nylon yarn (for example, the nylon yarn of 40D is selected) and the moderate spandex (for example, the spandex of 30D is selected) are bundled together. Then, the bundle is fed in two yarns on the knitting machine to knit an elastic, light and thin glove liner.

7-gauge, 10-gauge, 13-gauge, 15-gauge and 18-gauge knitting machines are available, and according to features of this model of gloves and requirements of yarn, the 15-gauge knitting machine is selected, to enhance density of yarns of the gloves.

In the selection of the glove liner, a method different from the conventional process is adopted, so that the glove liner is more elastic, and fit for the hand.

In step 2, a hand former is covered with the glove liner and put into an oven of 75° C. to 80° C. for pre-heating for 15 minutes.

In step 3, after the pre-heating, the hand former covered with the glove liner is dipped into a coagulant completely.

The coagulant is a mixed solution of calcium chloride and methanol with a concentration of 1.8%. The mixed solution of calcium chloride and methanol with the concentration of 1.8% refers to that, every 100 kg of the mixed solution contains 1.8 kg of calcium chloride, and the rest is methanol solution.

In step 4, the hand former covered with the glove liner that has been dipped with the coagulant is dipped into a latex, and is dipped into the latex for 10 mm with the palm down.

The latex is a mixture of vulcanized nitrile-butadiene rubber and water-soluble polyurethane latex.

Features of the nitrile-butadiene rubber include: high abrasion resistance, good heat resistance, desirable oil resistance, and strong cohesion, and the disadvantage there of is low elasticity.

Features of the water-soluble polyurethane latex (referred to as water-soluble polyurethane in brief) include: good handfeel, being environmental friendly and not easily fractured, desirable low temperature resistance and flexure resistance. When being used on the surface of the glove, the water-soluble polyurethane improves a film-forming property and cohesion strength of the glove significantly, gives a soft and full handfeel to the texture, and improves wrinkle resistance, resilience, permeability and heat resistance of the glove. The disadvantage of the water-soluble polyurethane is poor abrasion resistance.

In the present invention, the water-soluble polyurethane and the nitrile-butadiene rubber are mixed to give a combination of high elasticity, oil resistance and abrasion resistance to the surface of the glove.

After the water-soluble polyurethane and the nitrile-butadiene rubber are mixed based on a certain proportion, the elasticity of the glove surface is improved significantly; however, flexibility is unsatisfactory. As regards the feature of the nitrile-butadiene rubber with a higher content, adding a rubber softener is an optimal solution, and the specific process is described below.

In step 5, the surface of the hand former covered with the glove liner that has been dipped with the latex is dried, that is, the hand former covered with the glove liner that has been dipped with the latex is put into a hot blast heater, and hot blast of 60° C. to 70° C. is blown to the surface of the glove liner for 120 s under an even turning condition.

In step 6, after the surface is dried, the hand former covered with the glove liner is dipped into the latex mentioned in step 4 again, and is dipped into the latex for 12 mm with the palm down.

In step 7, the hand former covered with the glove liner is taken out from the latex, and soluble solid particles with a particle size of 60 to 80 meshes are sprayed on the surface evenly, in which the soluble solid particles are sugar, salt or sodium sulfate with a particle size of 60 to 80 meshes.

In step 8, the hand former covered with the glove liner, the surface thereof being sprayed with the soluble solid particles, is baked, that is, the hand former covered with the glove liner, the surface thereof being sprayed with the soluble solid particles, is put into the oven, the temperature of which is maintained at 75° C. to 80° C., and is baked for 15 min.

In step 9, the hand former covered with the glove liner, the surface thereof being baked and sprayed with the soluble solid particles, is dipped into water to dissolve the soluble solid particles, that is, the hand former is dipped for three times, each lasting for 15 min. For the first time, water of room temperature is used, for the second time, warm water of 40° C. is used, and for the third time, water of room temperature is used.

One of the principal factors of the gripping power problem is smoothness of the glove surface. Certain roughness contributes to better slipping resistance of the glove. Soluble solid particles are sprayed on the surface of that undergoes the secondary latex dipping, and then a rough and fluffy surface is formed after baking and dissolving, thereby embodying the slipping resistance optimally.

In step 10, the hand former covered with the glove liner that has been dipped is baked, that is, the hand former covered with the glove liner, the surface thereof being sprayed with the soluble solid particles, is put into the oven, the temperature of which is maintained at 75° C. to 80° C. and is baked for 45 min, and is further baked for 60 min after the temperature of the oven is adjusted to 90° C. to 95° C.

In step 11, the glove liner is taken off from the hand former, thereby getting a glove with enhanced gripping power.

Based on the above technical solution, the viscosity of the latex in steps 4 and 6 is 650 to 750 mPa·s. The latex is a mixture of vulcanized nitrile-butadiene rubber and water-soluble polyurethane latex.

A. A method for preparing the water-soluble polyurethane latex includes: taking 100 g of water-soluble polyurethane and 25 g of sodium polyacrylate, and stirring evenly for 60 min at a rotating speed of 80 rad/min.

B. A specific method for preparing the vulcanized nitrile-butadiene rubber is described as follows.

3.1 A vulcanization dispersing agent is prepared according to the following proportioning:

water 100 kg
sulphur 14 kg
zinc oxide 28 kg
accelerator BZ 7 kg
titanium dioxide 28 kg
age resistor BHT 18.6 kg
dispersing agent NF- 3 kg
10% casein 7 kg
abrasion resistor AG-212 10.5 kg In step 3.2, the components in step 3.1 are mixed and put into a ball grinder for grinding for more than 48 hours until the mesh thereof is below 600, thereby obtaining the vulcanization dispersing agent. Optimally, the dispersing agent is at 650 to 750 meshes.

In step 3.3, 5.4 kg to 5.6 kg of the vulcanization dispersing agent made in step 3.2 is added into every 100 kg of nitrile-butadiene rubber, and the nitrile-butadiene rubber is vulcanized.

According to the European Union standard EN388, an abrasion resistance index of nitrile-butadiene gloves needs to meet level 4, that is, abrasion on abrasive paper is more than 8000 cycles. After the water-soluble polyurethane is added into the nitrile-butadiene rubber, the abrasion resistance is reduced greatly. In this case, the method of adding an abrasion resistor during rubber vulcanization is adopted to solve the problem of abrasion resistance index. Meanwhile, secondary latex dipping is also an important method to improve the abrasion resistance index.

Specific steps for vulcanizing the nitrile-butadiene rubber include: taking 180 kg of the nitrile-butadiene rubber and 10 kg of the vulcanization dispersing agent; first stirring the nitrile-butadiene rubber for 2 hours at a constant stirring speed of 40 rad/min; then slowly pouring the vulcanization dispersing agent at a stifling speed of 80 rad/min, and performing heat preservation at above 28° C. for two hours; and settling the mixture for 48 hours for later use. The slow pouring of the vulcanization dispersing agent refers to that 10 kg of the vulcanization dispersing agent is completely added within 1 min.

Based on the above technical solution, a foaming method is adopted for the foaming of the latex. Time, speed, machine power and settling time of the foaming determine the quality of gloves. After many times of experiments, criteria are defined for the above requirements, which are specified as follows: 88 kg of vulcanized nitrile-butadiene rubber is added with 12 kg of water-soluble polyurethane, stirred for 10 min and foamed for 10 min, then added with the sodium polyacrylate and tackified to 400 mPa·s, added with 12 kg of water at a rotating speed of 600 rad/min, foamed for 120 min at a constant rotating speed of 200 rad/min, added with the sodium polyacrylate and tackified to 700±150 mPa·s, added with 4 kg of a rubber softener of AS.TMD-1747 type, and finally stirred for 30 min, to obtain the latex with the viscosity of 650 to 750 mPa·S.

In conclusion, the present invention adopts a combination of water-soluble polyurethane (water-soluble PU) and nitrile-butadiene rubber for twice latex dipping of the glove surface, the latex surface is then sprayed with the solid material, and finally the solid material is dissolved, so that the glove is comfortable, and the surface thereof is fluffy to contribute to a desirable slip-proof effect.

In the present invention, an apparatus shown in FIG. 2 is used to test the made glove with enhanced gripping power. In FIG. 2, a vertical support 2, which is an inverted T-shaped support, is disposed with a screen 1 for displaying weight and a sensor 4. An upper portion of the vertical support 2 is further disposed with another set of T-shaped support formed by a stainless steel tube 3 with a smooth surface. The sensor 4 is used to test a tension on the stainless steel tube 3, and data of the tension may be displayed on the screen 1.

A specific experiment is described as follows:

The stainless steel tube 3 is painted with machine oil with a 2.5 cm paint brush until the machine oil starts to drop. A tester wears a glove on a right hand and brushes with a brush dipped with the machine oil. It should be noted that, a new glove is used in each test, and the glove is brushed twice from wrist to fingertip. Then, the tester grasps a middle portion of the stainless steel tube 3 with the right hand. The weight displayed on the screen is an anti-slipping force.

The following table shows a group of comparison data in the anti-slipping force test.

| Existing glove | Glove of the present invention |
| --- | --- |
| 7.8 KG | 22 KG |
| 8.2 KG | 25 KG |
| 8.0 KG | 24 KG |
| 8.1 KG | 23.8 KG |
| 7.9 KG | 24.6 KG |

According to the above data of the anti-slipping force, gloves made in the present invention have a better slip-proof effect in an oily environment. An average tension of the existing gloves is 8 KG. An average tension of the gloves in the present invention is 23.88 KG, and the anti-slipping force thereof is 2.985 times more than that of the prior art.

In the present invention, an apparatus shown in FIG. 3 is used to test the made glove with enhanced gripping power. FIG. 3 only differs from FIG. 2 in the mounting position of the sensor 4. A certain weight of load 6 is hung below a glove 5 to be tested, and following parameters of a 24 cm normal nitrile-butadiene rubber glove without water-soluble polyurethane and a 24 cm glove with enhanced gripping power made in the present invention are compared:

1. Stretch Distance

When a tension reaches 9.5 KG, the glove of the present invention stretches to a limit point, in which a stretch length thereof changes from 24 cm to 43 cm, and a traverse distortion thereof changes from 12 cm to 21.5 cm.

A stretch length of the normal glove changes from 24 cm to 29 cm, and a traverse distortion thereof changes from 12 cm to 215 cm.

2. Distortion Recovery

The glove of the present invention restores to the original shape in 3 seconds.

The normal glove is slightly deformed, and fails to restore to the original shape.

3. Resilience Comparison

| Glove of the present invention | Normal glove |
|---|---|
| 79% | 21% |

What we claim is:

1. A method for making gloves with a gripping power, comprising:

step 1, bundling a nylon yarn and a moderate spandex together, feeding the bundle in two yarns on a knitting machine, and making a glove liner by using a 15-gauge glove machine, wherein the nylon yarn is a nylon yarn of 40D, and the moderate spandex is a spandex of 30D;

step 2, covering a hand former with the glove liner and putting the hand former into an oven of 75° C. to 80° C. for pre-heating for 15 minutes;

step 3, after the pre-heating, dipping the hand former covered with the glove liner into a coagulant completely, wherein the coagulant is a mixed solution of calcium chloride and methanol with a concentration of 1.8%, and the mixed solution of calcium chloride and methanol with the concentration of 1.8% refers to that, every 100 kg of the mixed solution contains 1.8 kg of calcium chloride, and the rest is methanol solution;

step 4, dipping the hand former covered with the glove liner that has been dipped with the coagulant into a latex, and dipping the hand former into the latex for 10 mm with the palm down, wherein the latex is a mixture of vulcanized nitrile-butadiene rubber and water-soluble polyurethane latex;

step 5, drying the surface of the hand former covered with the glove liner that has been dipped with the latex, comprising, putting the hand former covered with the glove liner that has been dipped with the latex into a hot blast heater, and blowing hot blast of 60° C. to 70° C. to the surface of the glove liner for 120 s under an even turning condition;

step 6, after the surface is dried, dipping the hand former covered with the glove liner into the latex mentioned in step 4 again, and dipping the hand former into the latex for 12 mm with the palm down;

step 7, taking out the hand former covered with the glove liner from the latex, and spraying soluble solid particles with a particle size of 60 to 80 meshes on the surface evenly, wherein the soluble solid particles are sugar, salt or sodium sulfate with a particle size of 60 to 80 meshes;

step 8, baking the hand former covered with the glove liner, the surface thereof being sprayed with the soluble solid particles, comprising, putting the hand former covered with the glove liner, the surface thereof being sprayed with the soluble solid particles, into the oven, maintaining the temperature of the oven at 75° C. to 80° C., and baking for 15 min;

step 9, dipping the hand former covered with the glove liner, the surface thereof being baked and sprayed with the soluble solid particles, into water to dissolve the soluble solid particles, comprising, dipping the hand former for three times, each lasting for 15 min, wherein for the first time, water of room temperature is used, for the second time, warm water of 40° C. is used, and for the third time, water of room temperature is used;

step 10, baking the hand former covered with the glove liner that has been dipped, comprising, putting the hand former covered with the glove liner, the surface thereof being sprayed with the soluble solid particles, into the oven, maintaining the temperature of the oven at 75° C. to 80° C., and baking for 45 min, and further baking for 60 min after adjusting the temperature of the oven to 90° C. to 95° C.; and step 11, taking off the glove liner from the hand former, thereby getting a glove with a gripping power.

2. The method for preparing gloves with a gripping power according to claim 1, wherein the viscosity of the latex in steps 4 and 6 is 650 to 750 mPa·s.

3. The method for preparing gloves with a gripping power according to claim 2, wherein a specific method for preparing the vulcanized nitrile-butadiene rubber comprises:

step 3.1: preparing a vulcanization dispersing agent according to the following proportioning:

| |
|---|
| water 100 kg |
| sulphur 14 kg |
| zinc oxide 28 kg |
| accelerator BZ7 kg |
| titanium dioxide 28 kg |
| age resistor BHT 18.6 kg |
| dispersing agent NF- 3 kg |
| 10% casein 7 kg |
| abrasion resistor AG-212 10.5 kg | step 3.2: mixing the components in step 3.1 and putting the mixture into a ball grinder for grinding for more than 48 hours, until the mesh thereof is below 600, thereby obtaining the vulcanization dispersing agent; and step 3.3: adding 5.4 kg to 5.6 kg of the vulcanization dispersing agent made in step 3.2 into every 100 kg of nitrile-butadiene rubber, and vulcanizing the nitrile-butadiene rubber.

4. The method for preparing gloves with a gripping power according to claim 3, wherein the vulcanization dispersing agent is of 650 to 750 meshes.

5. The method for preparing gloves with a gripping power according to claim 3, wherein specific steps for vulcanizing the nitrile-butadiene rubber comprise: taking 180 kg of the nitrile-butadiene rubber and 10 kg of the vulcanization dispersing agent; first stirring the nitrile-butadiene rubber for two hours at a constant stirring speed of 40 rad/min; then slowly pouring the vulcanization dispersing agent at a stirring speed of 80 rad/min, and performing heat preservation at above 28° C. for two hours; and settling the mixture for 48 hours for later use, wherein the slow pouring of the vulcanization dispersing agent refers to that 10 kg of the vulcanization dispersing agent is completely added within 1 min.

6. The method for preparing gloves with a gripping power according to claim 2, wherein a method for preparing the water-soluble polyurethane latex comprises: taking 100 g of water-soluble polyurethane and 25 g of sodium polyacrylate, and stirring evenly for 60 min at a rotating speed of 80 rad/min.

7. The method for preparing gloves with a gripping power according to claim 2, wherein 88 kg of vulcanized nitrile-butadiene rubber is added with 12 kg of water-soluble polyurethane, stirred for 10 min and foamed for 10 min, then added with the sodium polyacrylate and tackified to 400 mPa·s, added with 12 kg of water at a rotating speed of 600 rad/min, foamed for 120 min at a constant rotating speed of 200 rad/min, added with the sodium polyacrylate and tackified to 700±50 mPa·s, added with 4 kg of a rubber softener of AS.TMD-1747 type, and finally stirred for 30 min, to obtain the latex with the viscosity of 650 to 750 mPa·S.

* * * * *